(12) United States Patent
Patronen et al.

(10) Patent No.: US 6,289,219 B1
(45) Date of Patent: Sep. 11, 2001

(54) HANDOVER IN A BASE STATION

(75) Inventors: Petri Patronen, Oulu (FI); Jari Ryynänen, Fujian (CN)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/445,600

(22) PCT Filed: Jun. 17, 1998

(86) PCT No.: PCT/FI98/00530

§ 371 Date: Mar. 10, 2000

§ 102(e) Date: Mar. 10, 2000

(87) PCT Pub. No.: WO99/01003

PCT Pub. Date: Jan. 7, 1999

(30) Foreign Application Priority Data

Jun. 18, 1997 (FI) .......................................... 972617

(51) Int. Cl.$^7$ .................................................. H04Q 7/20
(52) U.S. Cl. ...................... 455/436; 455/439; 455/562; 455/452; 455/450
(58) Field of Search .................. 455/436, 562, 455/439, 447, 450, 452

(56) References Cited

U.S. PATENT DOCUMENTS

| | | | |
|---|---|---|---|
| 4,932,049 | * 6/1990 | Lee | 379/60 |
| 5,243,598 | * 9/1993 | Lee | 370/95.3 |
| 5,392,331 | 2/1995 | Patsiokas et al. | |
| 5,504,936 | * 4/1996 | Lee | 455/34.2 |
| 5,708,969 | * 1/1998 | Kotzin et al. | 455/34.2 |
| 5,848,358 | * 12/1998 | Forssen et al. | 455/437 |
| 5,893,033 | * 4/1999 | Keskitalo et al. | 455/437 |
| 6,038,450 | * 3/2000 | Brink et al. | 455/442 |

FOREIGN PATENT DOCUMENTS

| | | |
|---|---|---|
| 0 844 801 | 5/1998 | (EP) . |
| 972617 | 11/1998 | (FI) . |
| 94/08404 | 4/1994 | (WO) . |
| 96/08089 | 3/1996 | (WO) . |
| 96/21998 | 7/1996 | (WO) . |

OTHER PUBLICATIONS

M. Mouley Et Al, "The GSM System for Mobile Communications", The GSM System, 1992, p. 396, line 3—line 22.
"Aspects of Discontinuous Tranmissions (DTX))," The GSM System, Apr. 1993, pp. 18–20.

\* cited by examiner

Primary Examiner—William G. Trost
Assistant Examiner—Marceau Milord
(74) Attorney, Agent, or Firm—Pillsbury Winthrop LLP

(57) ABSTRACT

Provided is a method and system for performing a handover of a terminal subscriber between sub-cells in a cellular radio network base station. In the method and system, signals from antenna units corresponding to each of the sub-cells are added together to form a combined signal. A signal power of the combined signal and the signal power a signal from a serving sub-cell are measured in a transceiver of the base station. The measurement results are compared. If the signal power of the combined signal is greater than the signal power of the signal from the serving sub-cell, a handover of the terminal subscriber is performed.

10 Claims, 5 Drawing Sheets

HANDOVER IN A BASE STATION

This application is the national phase of international application PCT/FI98/00530 filed Jun. 17, 1998 which designated the U.S.

FIELD OF THE INVENTION

The invention relates to a method for performing a handover between sub-cells in a cellular radio network base station applying dynamic channel allocation, the base station comprising: at least two sub-cells; in each sub-cell, an antenna unit with a fixed connection to the base station; a radio connection via the antenna unit to a subscriber terminal located in a sub-cell; at least one transceiver arranged to measure reception power from the radio connection; in which method: the reception power of a signal sent by the subscriber terminal on the radio connection is measured via an antenna unit of a serving sub-cell; the reception power of a signal sent by the subscriber terminal on the radio connection is measured in turn via antenna units of other than the serving sub-cell; a handover between sub-cells is performed from an antenna unit of the serving sub-cell to an antenna unit of another sub-cell providing a better reception power.

BACKGROUND OF THE INVENTION

A problem in the above described arrangement is that a transceiver providing a radio connection can only measure the power of a received signal via one antenna unit at a time. When another antenna, other than the serving sub-cell's antenna unit, is connected to the transceiver and is used for measuring a received signal, the data the signal in question can be lost if its quality is too poor for it to be interpreted. In the worst case the radio connection can even be terminated.

A possible solution would be to receive every second received signal, at the most, via another than the serving sub-cell's antenna unit. Then the quality of the radio connection might not be as degraded, because of lost bursts. A problem would arise, however, because the measurements for performing a handover may take too long, which impairs the success of the handover.

BRIEF DESCRIPTION OF THE INVENTION

An object of the invention is thus to provide a method and an equipment implementing the method so as to allow the above problems to be solved.

This is achieved with a method described in the preamble, characterized in that: signals sent by the subscriber terminal on the radio connection and received via the antenna unit of the serving sub-cell and the antenna unit of the other sub-cell are combined to provide a combined signal; a handover is performed from the antenna unit of the serving sub-cell to the antenna unit of the other sub-cell when, as a result of a comparison of the combined signal with the signal of the serving sub-cell, the reception power of the signal received via the antenna unit of the other sub-cell is detected to be better than the reception power of the signal received via the antenna unit of the serving sub-cell.

The invention also relates to a cellular radio network base station comprising: dynamic channel allocation; at least two sub-cells; in each sub-cell, an antenna unit with a fixed connection to the base station; a radio connection via an antenna unit to a subscriber terminal located in a sub-cell; at least one transceiver arranged to measure reception power from the radio connection; a switching field for connecting radio connection signals to travel between a particular transceiver and antenna unit; a control unit controlling the switching field and communicating with the transceivers.

The base station is characterized in that the switching field comprises at least one switch for combining signals sent by the subscriber terminal on the radio connection and received via the antenna unit of the serving sub-cell and the antenna unit of another sub-cell to generate a combined signal; the control unit is arranged to perform a handover from the antenna unit of the serving sub-cell to the antenna unit of the other sub-cell when a comparison of the combined signal with the signal of the serving sub-cell shows that the reception power of the signal received via the antenna unit of the other sub-cell is better than the reception power of the signal received via the antenna unit of the serving sub-cell.

Preferred embodiments of the invention are disclosed in the dependent claims.

The basis of the invention is that two signals, i.e. one of a serving sub-cell and of another cell, received via different antenna units are combined and the reception power is measured from the combined signal, instead of the individual signals being measured. A comparison of the measurement result of the combined signal with the measurement result of the signal of the serving sub-cell allows conclusions to be made about the mutual relationship between the reception powers on the basis of which the best antenna unit for a handover can be selected.

A method and arrangement of the invention provide several advantages. The reliability of handover improves. The quality of radio connection remains good also during handover because bursts are not lost due to reception power measurement because also the signal received via the antenna unit of the serving sub-cell is utilized all the time.

BRIEF DESCRIPTION OF THE DRAWINGS

In the following the invention will be described in greater detail with reference to the attached drawings, in which.

DETAILED DESCRIPTION OF THE INVENTION

Figure 1:
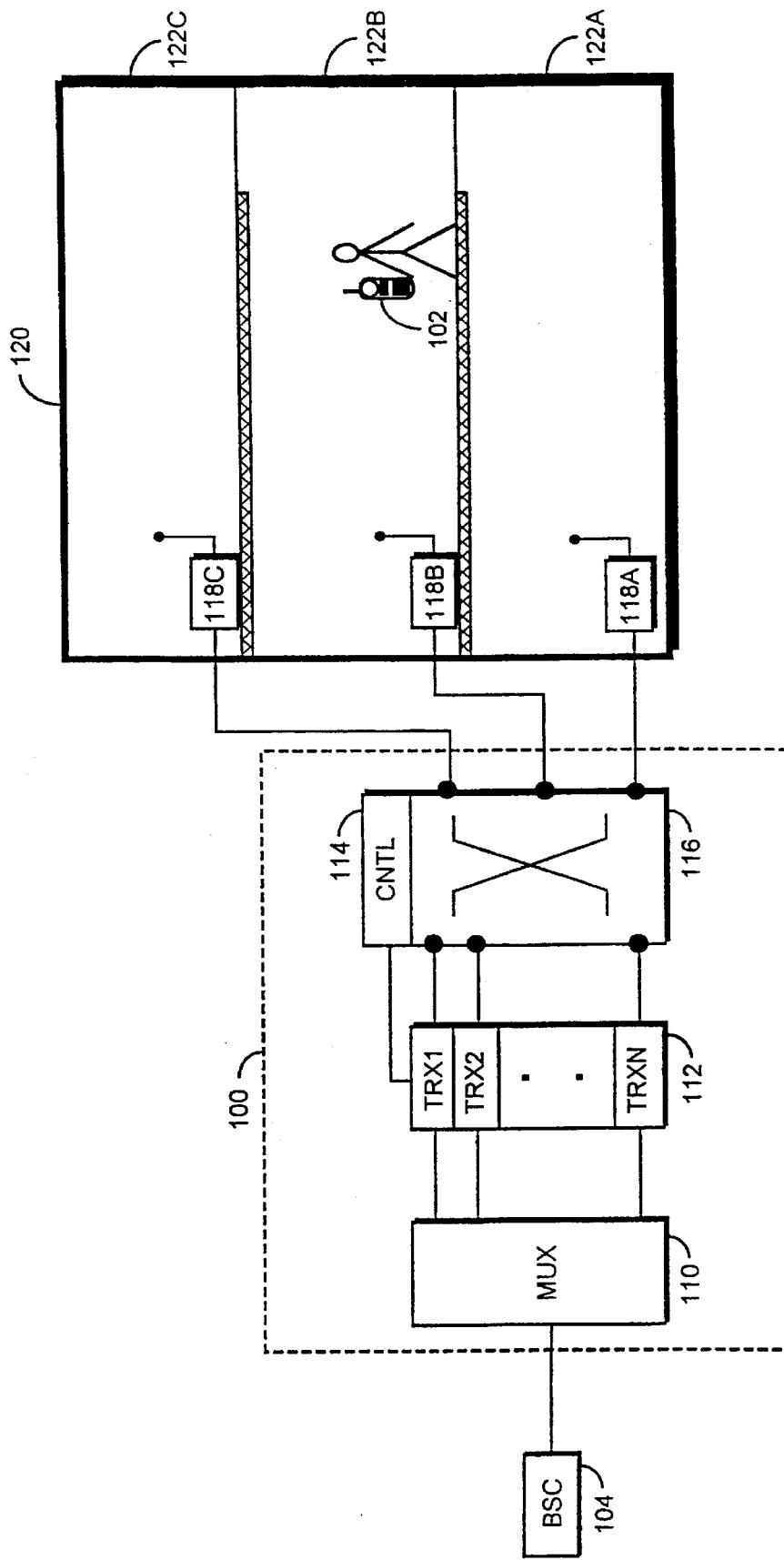
FIG. 1 illustrates an example of a base station according to the invention.

With reference to FIG. 1, let us now study a cellular radio network of the invention. The cellular radio network comprises at least one base station 100 applying dynamic channel allocation, i.e. a channel allocation method in the purest form of which all system frequencies are in use in every cell. Channel selection is performed at call set-up on the basis of the interference situation prevailing at the moment in question. The system possibly also comprises base stations applying fixed channel allocation, i.e. a channel allocation method in which the frequencies available to the system are divided into groups, each cell then using a particular frequency group. One and the same frequency group can be re-allocated to cells that are sufficiently far apart from each other.

The invention is thus applicable for use in office systems only comprising base stations of the invention, or in different hybrid systems which possibly use also macro cells that apply fixed or dynamic channel allocation. The cellular radio network of the invention is preferably a GSM/DCS/PCS 1900 network.

The base station 100 is in contact with a base station controller 104 controlling one or more base stations. In certain types of systems, such as in small separate office systems, the operations of the base station 100 and the base station controller 104 can be integrated into one and the same physical apparatus.

FIG. 1 illustrates, as an example of the sub-cells of the base station 100, a ground floor 122A, a first floor 122B and a second floor 122C of a multi-storey building 120. In each floor 122A, 122B, 122C, the base station is provided with a fixed connection to an antenna unit 118A, 118B, 118C. An antenna unit can comprise one or more antennas. A fixed connection can be implemented for instance by means of a coaxial cable or optical fibre. The connection can be simplex or duplex. In a duplex connection the antenna unit 118A, 118B, 118C then comprises a duplex filter, an antenna filter, and amplifiers for both transmission directions. There are naturally also other ways of forming sub-cells, a sub-cell can be for instance a predetermined geographical area or, in a building, an area occupied by a particular floor. The number of sub-cells can also greatly vary depending on the situation.

For the sake of clarity, the Figure only illustrates one person carrying a subscriber terminal 102 in the building.

FIG. 1 also shows a more detailed structure of the base station 100. FIG. 1 only comprises the blocks that are essential for describing the invention, although it is apparent to a person skilled in the art that a common base station comprises other functions and structures, too, which need not be discussed in greater detail here. The base station can be for instance of the type used in the GSM system, comprising, however, the changes required by the invention. The base station comprises one or more transceivers TRX1–TRX2–TRXN. One transceiver TRX1–TRXN offers radio capacity for one TDMA frame, i.e. usually for eight time slots.

The base station 100 also comprises a switching field 116 and a control unit 114 controlling the operation of the switching field, the control unit having a connection to each transceiver TRX1–TRXN. The switching field 116 connects the signals to travel between a particular transceiver TRX1–TRXN and one or more antenna units 118A, 118B, 118C. The connection can be made time slot specifically. The number of transceivers TRX1–TRXN can be larger than the number of frequencies in use because dynamic allocation of channels allows frequencies to be re-used, ideally in an adjacent sub-cell already.

Figure 2A:
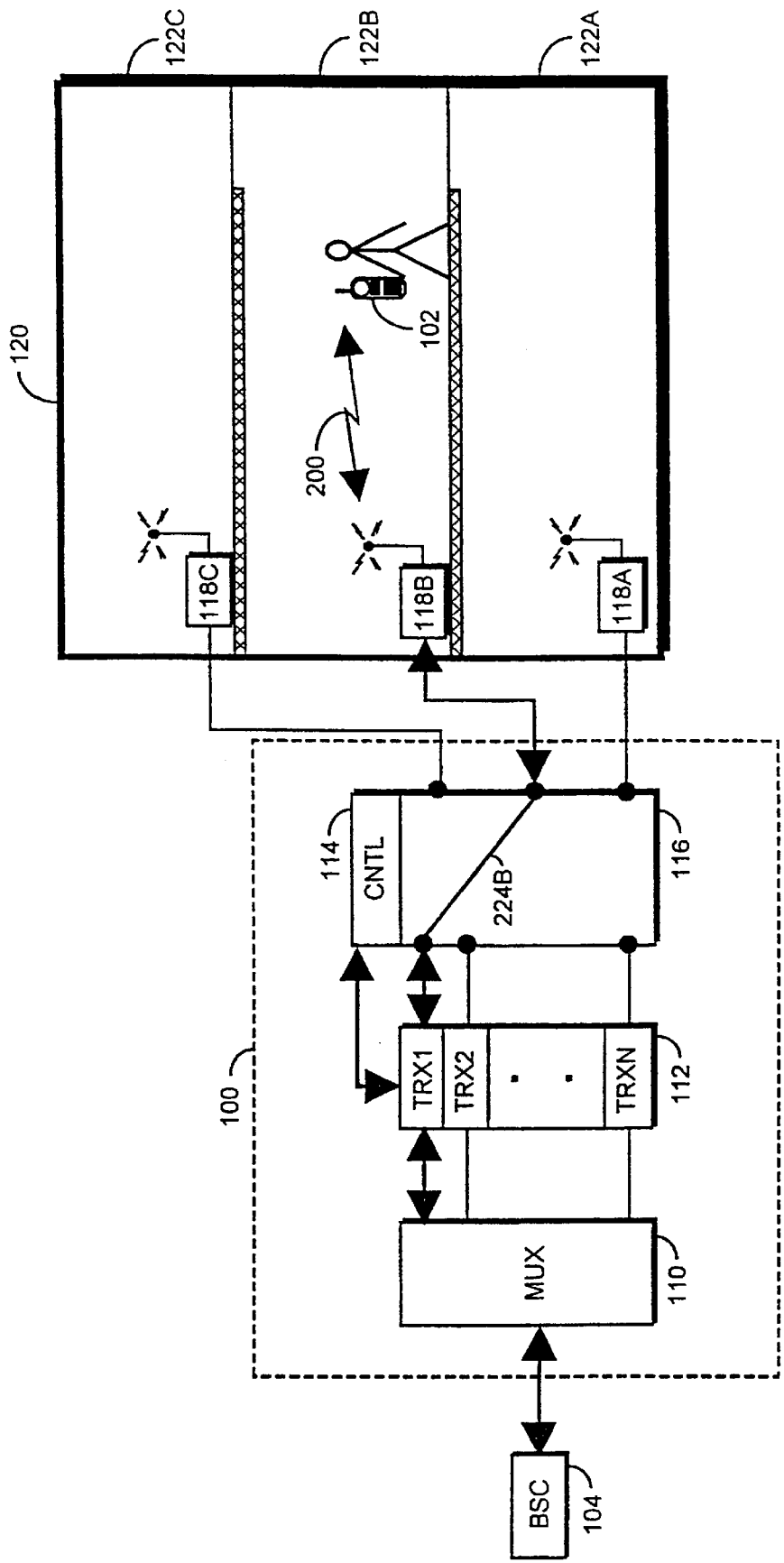
FIGS. 2A, 2B, 2C and 2D illustrate an example of a handover according to the invention.

FIG. 2A illustrates the system shown in FIG. 1 in operation. Data needed for connection set-up is transmitted via the antenna units 118A, 118B, 118C to the subscriber terminal 102. From the subscriber terminal 102 is already established a bi-directional radio connection 200 via the antenna unit 118B of the. sub-cell of the first floor 122B. A thicker line in the Figure illustrates how signals 224B of the radio connection 200 travel from the antenna unit 118B to the switching field 116, via which a connection is established to the first transceiver TRX1. From the transceiver TRX1 the reception power, with the identifier data included, which is measured from the received signal 224B is conveyed to the control unit 114 controlling the switching field 116. The data received on the radio connection 200 from the transceiver TRX1 is conveyed to a multiplexer 110 from where it is transferred, channelled for instance on a time-division basis, to a base station controller 104 and from there further to other parts of the network, such as a mobile services switching centre, not described here.

Figure 2B:
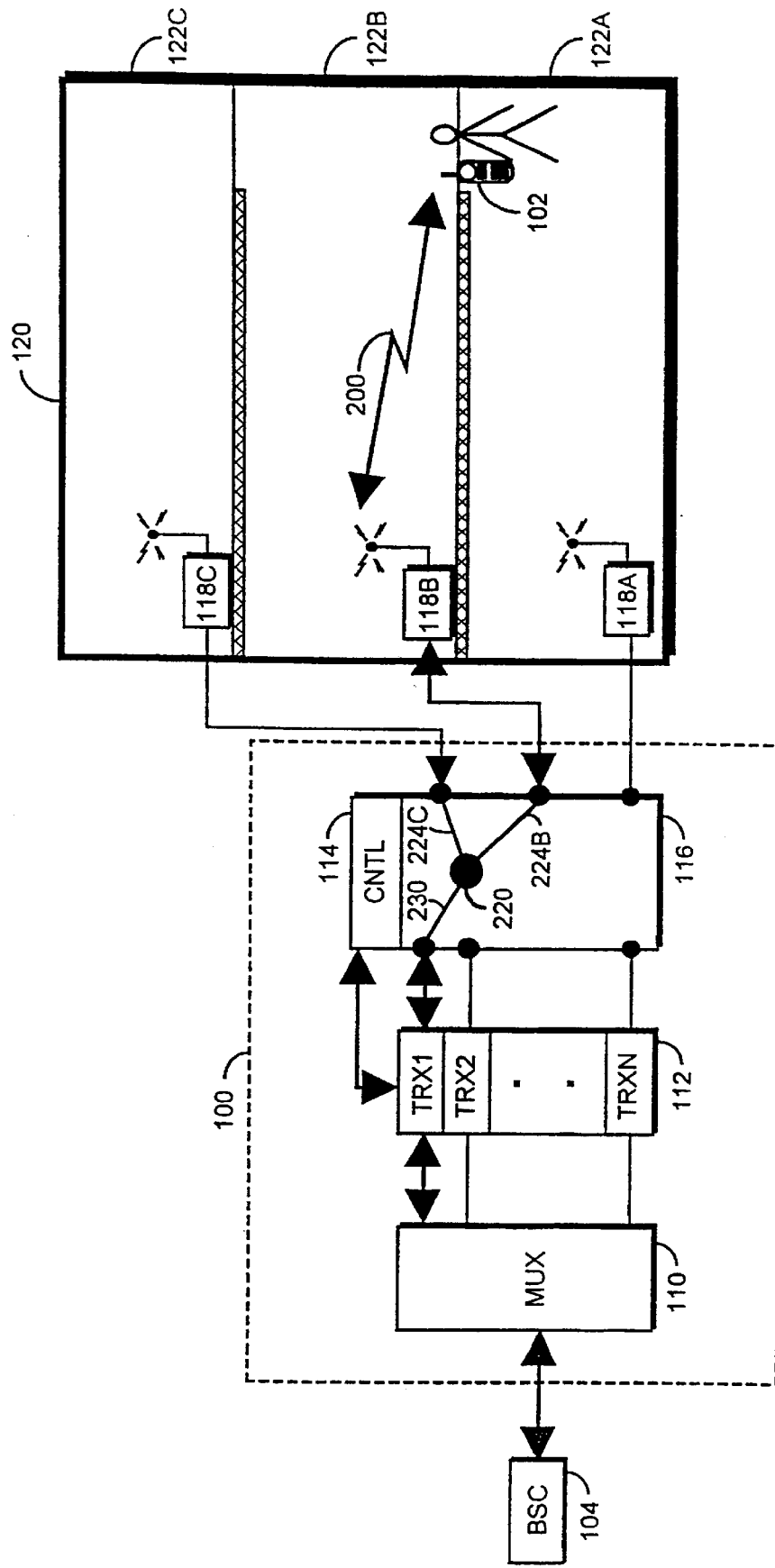

FIG. 2B illustrates a person who has moved with the subscriber terminal 102 midway the sub-cells in the ground floor 122A and in the first floor 122B, for instance in a staircase between the floors. The reception power measured in the transceiver TRX1 from the signal 224B of the antenna unit 118B of the first floor 122B has dropped below a predetermined limit, so the control unit 114 has directed, on the basis of the data received from the transceiver TRX1, a connection in the switching field 116 through a switch 220, the connection combining the signal 224B received on the radio connection 200 via the antenna unit 118B of the first floor 122B with the signal 224C received on the radio connection 200 from the antenna unit 118C of the second floor 122C. As the Figure shows, the coverage area of the antenna unit 118C of the second floor 122C does not reach the prevailing location of the subscriber terminal 102 between the ground floor 122A and the first floor 122B, so the switch 220 has nothing to combine with the signal 224B received from the antenna 118B, or the signal 224C to be combined is very weak. The reception power of the generated combined signal 230, measured in the transceiver TRX1, is so weak that after being informed thereof, the control unit 114 does not activate a handover from the antenna 118B to the antenna 118C.

Figure 2C:
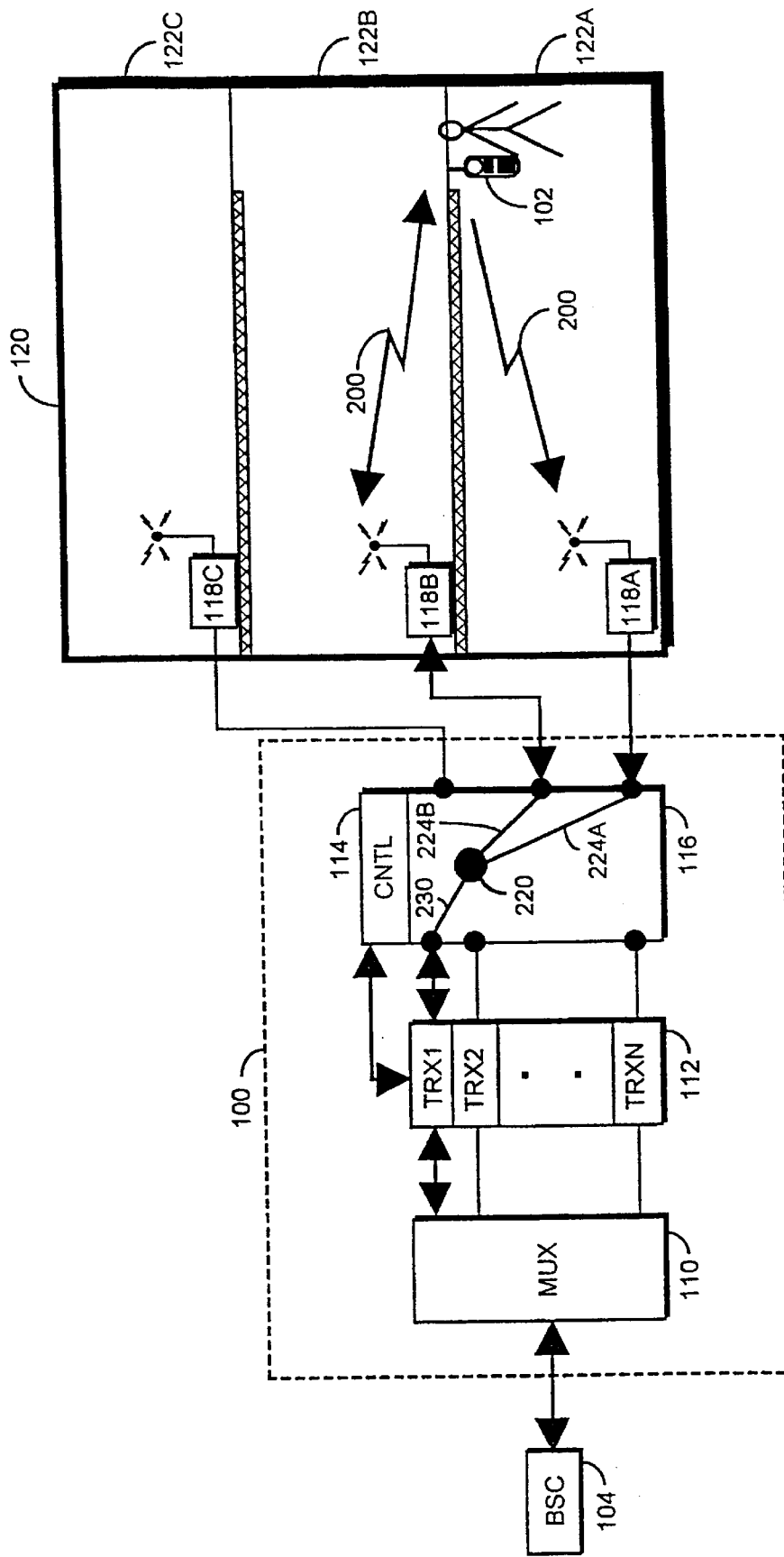

Instead, a switching shown in FIG. 2C will then be made, the switch 220 of the switching field 116 combining the signal 224B sent on the radio connection 200 by the subscriber terminal 102 and received via the antenna unit 118B of the original serving sub-cell 122B of the first floor with the signal 224A received via the antenna unit 118A of the sub-cell 122A of the ground floor.

Again, thicker lines illustrate signal propagation in the system. It is to be noted that in the case of both FIG. 2B and FIG. 2C the connection is maintained undisturbed through the base station 100 and farther because at least the signal 224B received via the antenna unit 118B of the serving sub-cell of the first floor 122B is being constantly conveyed to the transceiver TRX1. In fact, neither the base station controller 104 nor the subscriber terminal 102 detect in any way that handover is being planned. The base station controller 104 and the subscriber terminal 102 do not detect a handover taking place later either because although the changing of the sub-cell is referred to as a handover, the frequency and time slot of the radio connection remain the same also after the handover. It is therefore, in a way, a question of the responsibility for a connection being changed between the antenna units of two sub-cells. In other words, the term "channel" means a specific combination of frequency, time slot and place.

In FIG. 2C the transceiver TRX1 measures the reception power of the combined signal 230. When the measured power levels of the combined signal 230 and the signal 224B of the serving sub-cell 122B are compared, it is detected that the reception power of the signal 224A received via the antenna unit 118A of the sub-cell of the ground floor 122A is better than the reception power of the signal 224B received via the antenna unit 118B of the serving sub-cell 122B. This can be calculated for instance from an ideal case in which the reception power of the combined signal 230 should be about two times higher than that of the signal 224B of the serving sub-cell 122B to support the conclusion that the reception power of the signal 224A received via the antenna unit 118A of the new sub-cell 122A is at least equal to that of the signal 224B of the serving sub-cell 122B.

In practice, when signals are combined power loss takes place in the switch 220 of the switching field 116. The power loss can be as great as 3 dB, in other words, in practice the power of the combined signal 230 needs to be only slightly better than the signal 224B of the serving sub-cell 122B to justify handover. Power loss depends on the features of the switch 220 which therefore need to be established when the invention is taken into use, in order to allow the right limit to be set for decision-making.

Figure 2D:
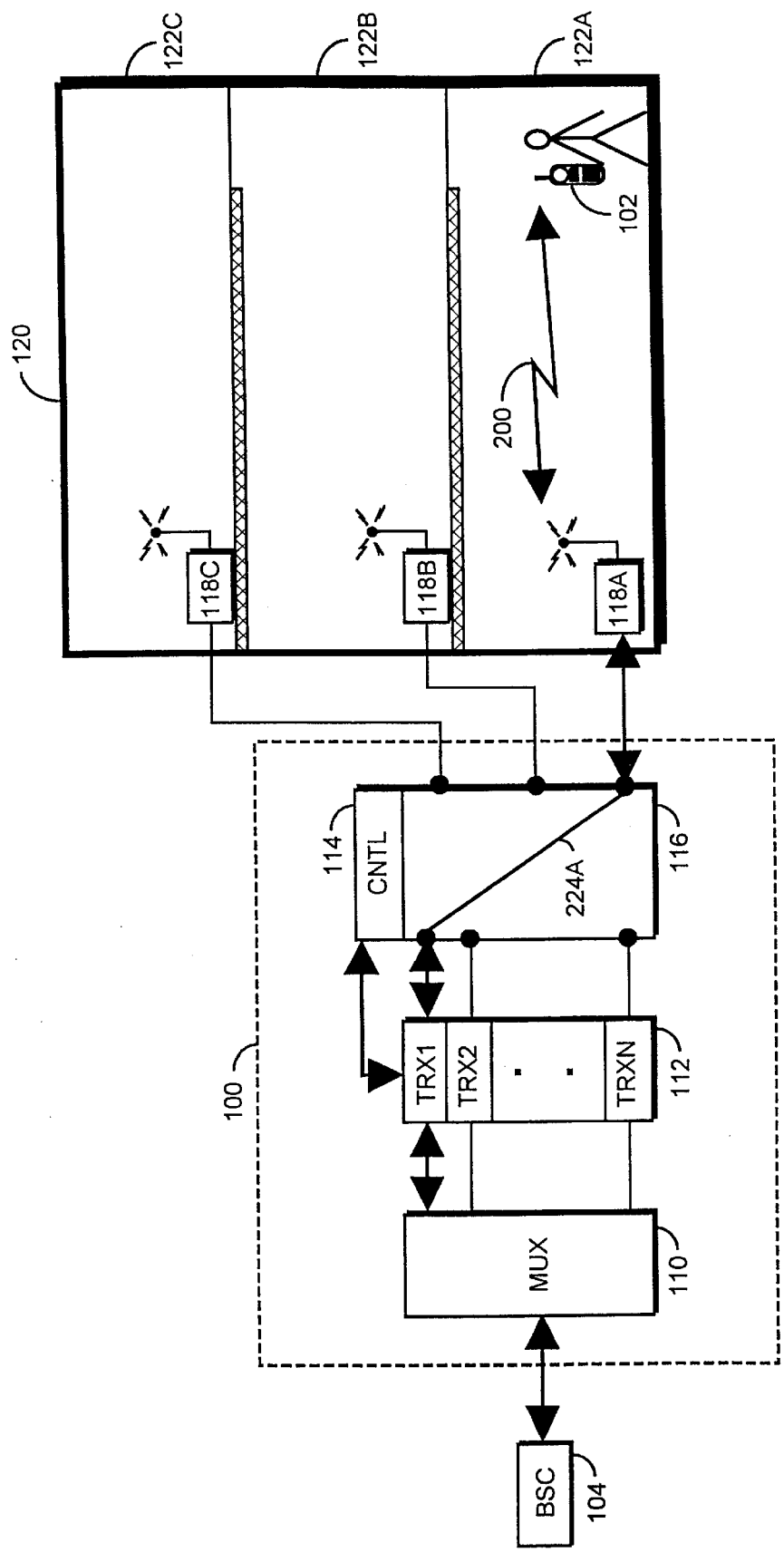

Since it was detected, as shown in FIG. 2C, that a handover from the antenna unit 118B of the first floor 122B to the antenna unit 118A of the ground floor 122A is advantageous, the control unit 114 directs, in a manner shown in FIG. 2D, a connection through the switching field 116 from the antenna unit 118A of the new serving sub-cell 112A to the transceiver TRX1. Signals sent by the subscriber terminal 102 on the radio connection 200 are no longer received via the original antenna unit 118B, and nothing is sent to the subscriber terminal 102 anymore either.

In the example illustrated in FIGS. 2A–2D it is easy for the base station to conclude the possible sub-cells for the handover. When a larger number of sub-cells is concerned, the base station most advantageously begins the measurements in neighbour sub-cells of the serving sub-cell. This speeds up handover. If a suitable sub-cell is not found, the measurements can be extended to concern sub-cells further away from the serving sub-cell.

It is also possible to measure the combined signal constantly, instead of waiting for the power level of the signal received via the serving sub-cell to drop below a predetermined level. This provides the advantage that the sub-cell providing the best reception power at a particular moment always has the responsibility for the connection.

The invention is advantageously implemented by means of software, the invention then requiring only relatively simple software changes to be made to a carefully limited area in the control unit 114. In addition, at least one switch 220 like the one described is needed in the switching field 116 to allow the two signals 224B, 224A to be combined to generate the signal 230.

According to a preferred embodiment, the base station 100 uses discontinuous transmission. Discontinuous transmission takes advantage of pauses, an often occurring characteristic of human speech, which do not carry any information to be transmitted. GSM, for instance, does not send all TDMA frames. Certain control channel signals are, however, always transmitted. Reception power is advantageously measured during the control channel signals because other subscriber terminals also broadcast at the same time and the prevailing interference allows the right picture to be obtained. An alternative would be to measure at random, which means that some of the subscriber terminals 102 might just have a pause in transmission, so after a while, when the subscriber terminals 102 applying discontinuous transmission would be broadcasting again, the measured transmission power would perhaps no longer correspond to reality. In the GSM system the control signals from which the measurement can be performed comprise a SACCH burst (Slow Associated Control Channel) associated with the traffic channel of each connection and a SID/L2 burst (Silence Descriptor/Layer 2). More detailed information about these bursts is available, when needed, in the GSM specification GSM 05.08 (4.5.0): April 1993, p. 18 to 20.

The embodiment concerned requires a synchronic network or at least the network part where the invention is to be applied is required to be synchronic. This requirement is conveniently met in office systems which typically only comprise one base station. In larger office systems, or in other kinds of sub-cell arrangements, in which a plural number of base stations 100 are used, adjacent base stations and their possible neighbour base stations that apply the invention are synchronised with each other. This can be easily implemented by means of prior art, for instance by timing data being transmitted to base stations from base station controllers.

Even though the invention is described above with reference to an example shown in the attached drawings, it is apparent that the invention is not restricted to it, but can vary in many ways within the inventive idea disclosed in the attached claims.

What is claimed is:

1. A method for performing a handover between sub-cells in a cellular radio network base station applying dynamic channel allocation, the base station comprising at least two sub-cells, the at least two sub-cells including a servicing sub-cell and one other sub-cell, each including an antenna unit having a fixed connection to the base station, the method comprising:

establishing a radio connection between the serving sub-cell and a subscriber terminal via the antenna unit of a base station transceiver;

receiving in the transceiver a first signal sent by the subscriber terminal through the radio connection;

measuring the power of the received first signal in the transceiver;

receiving in the transceiver a combined signal, the combined signal including (i) the first signal and (ii) a second signal sent by the subscriber terminal via the antenna unit of the other sub-cell;

measuring the power of the received combined signal in the transceiver;

comparing the measured power of the received first signal with the measured power of the received combined signal; and performing a handover from the antenna unit of the serving sub-cell to the antenna unit of the other sub-cell if the measured power of the received combined signal is greater than the measured power of the received first signal.

2. A method according to claim 1 wherein the measuring of the signal power of the second signal is started via antenna units of other than the serving sub-cell when the signal power measured via the antenna unit of the serving sub-cell for the first signal drops below a predetermined limit.

3. A method according to claim 1, wherein the signal power of the second signal is constantly measured via antenna units of other than the serving sub-cell.

4. A method according to claim 1, wherein the subscriber terminal uses discontinuous transmission and the signal power is measured from received control channel signals.

5. A method according to claim 4, wherein the control channel signals are slow associated control channel and/or silence descriptor/layer 2 bursts.

6. A cellular radio network base station structured and arranged to dynamically allocate channels, the base station comprising:

at least two sub-cells including a serving sub-cell and one other sub-cell, each having an antenna unit configured to (i) facilitate a radio connection to a subscriber terminal positioned within at least one of the at least two sub-cells and (ii) transfer first and second radio connection signals, the first and second radio connection signals respectively corresponding to a radio connection with the serving sub-cell and the other sub-cell;

at least one transceiver configured to (i) receive the first and second radio connection signals transferred from the corresponding antenna units and (ii) measure a signal power thereof;

a switching field having a fixed connection with each of the antenna units and comprising at least one switch configured to combine the first and second radio connection signals to produce a combined signal, the switching field being configured to provide the combined signal to the at least one transceiver; and a control unit configured to control the switching field and communicate with the at least one transceiver;

wherein the control unit is structured and arranged to perform a handover from the antenna unit of the serving sub-cell to the antenna unit of the other sub-cell when the signal power of the combined signal is higher than the signal power of the first radio connection signal based upon a signal power comparison.

7. A base station according to claim 6, wherein the control unit is arranged to start to measure via antenna units of other than the serving sub-cell the signal power of the second radio connection signal when the signal power of the first radio connection signal drops below a predetermined limit.

8. A base station according to claim 6, wherein the control unit is arranged to receive the measurement results from the transceiver and the control unit is arranged to control the switching field and the switch in such a way that the signal power of the second signal is constantly measured via antenna units of other than the serving sub-cell.

9. A base station according to claim 6, wherein the subscriber terminal uses discontinuous transmission and the transceiver of the base station is arranged to measure signal power from received control channel signals.

10. A base station according to claim 9, wherein the control channel signals are slow associated control channel and/or silence descriptor/layer 2 bursts.

* * * * *